UNITED STATES PATENT OFFICE.

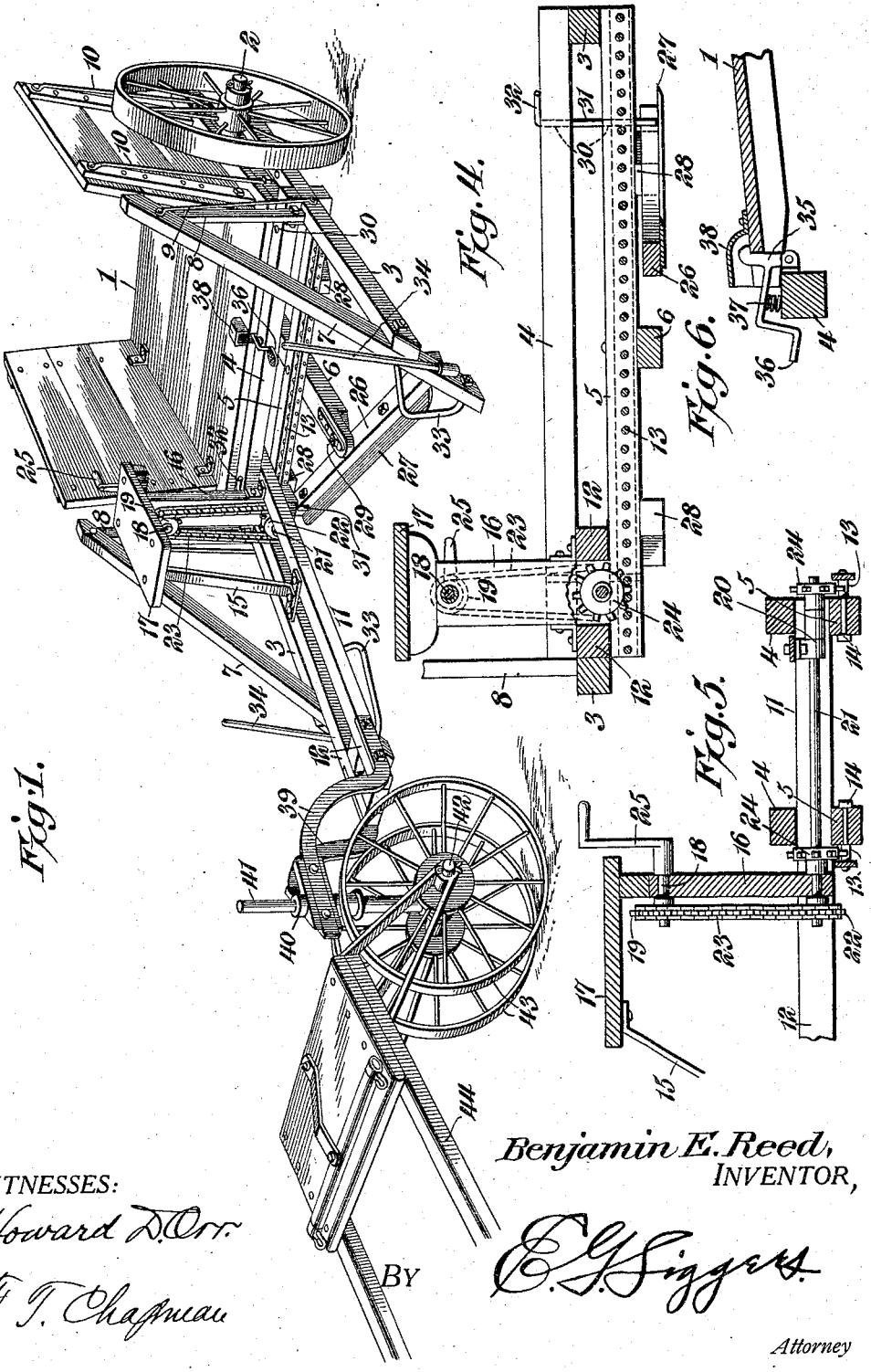

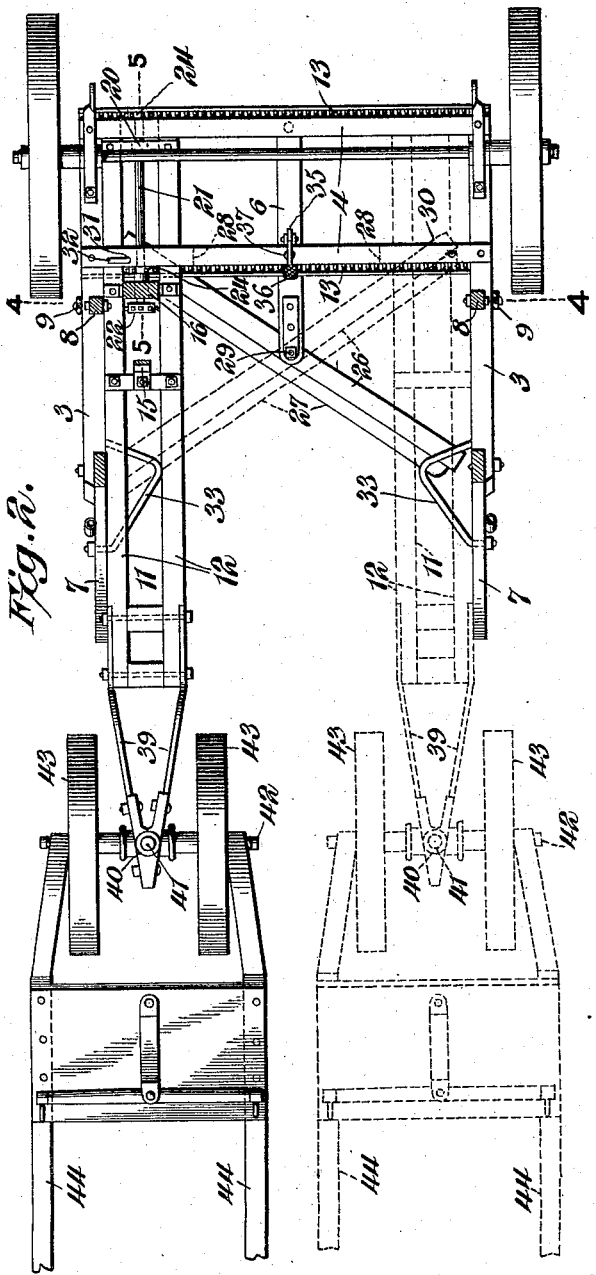
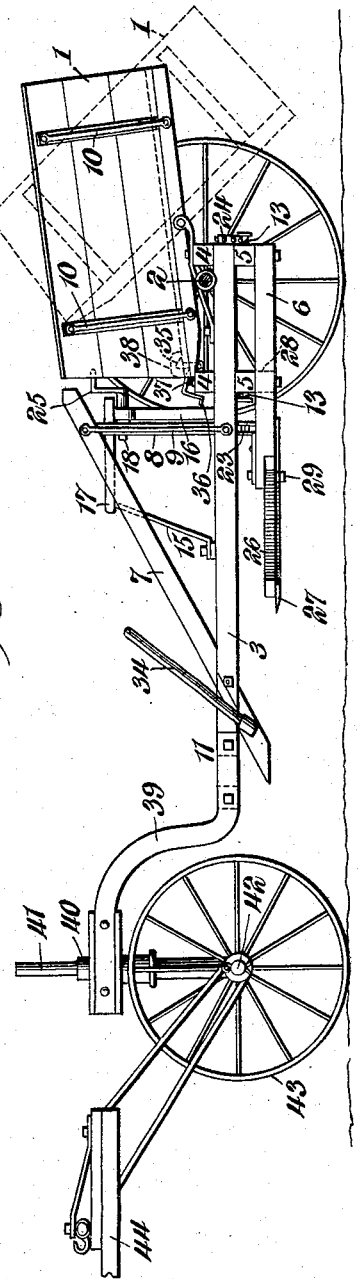

BENJAMIN ERNEST REED, OF PHILADELPHIA, PENNSYLVANIA.

CORN-CUTTING MACHINE.

1,183,768.  Specification of Letters Patent.  Patented May 16, 1916.

Application filed October 21, 1915. Serial No. 57,176.

*To all whom it may concern:*

Be it known that I, BENJAMIN E. REED, a citizen of the United States, residing at Philadelphia, in the county of Philadelphia and State of Pennsylvania, have invented a new and useful Corn-Cutting Machine, of which the following is a specification.

This invention has reference to corn harvesters, and its object is to provide a harvester for use in the field, whereby the draft animal or animals travel to one side of the row of corn being cut, so that the standing corn or corn which may have fallen down does not interfere with the progress of the draft animals.

In accordance with the present invention there is provided a vehicle comprising a front portion having sustaining wheels and means for attachment of a draft animal thereto, the sustaining wheels being placed close together so as not to have a spread beyond the sides of the draft animal while the rear portion of the vehicle has a greater spread and is mounted on wheels and may be utilized as a receiving and dumping member for the cut corn. The two members of the vehicle are connected by a reach sustained at the front end by the front wheels, and at the rear end capable of lateral movement with respect to the rear portion of the vehicle for a distance about equal to the width of the vehicle. The rear portion of the vehicle is provided with a cutting blade which in cutting position may be moved into slanting relation to the line of draft, thus acting on the corn with a shear cut. The blade is mounted to swing into either right or left slanting relation with respect to the line of cut, while the reach is movable to either the right or left side of the line of draft.

The invention will be best understood from a consideration of the following detailed description, taken in connection with the accompanying drawings forming part of this specification with the further understanding that while the drawings show a practical form of the invention, the latter is not confined to strict conformity with the showing of the drawings, but may be changed and modified so long as such changes and modifications come within the scope of the appended claims.

In the drawings:—Figure 1 is a perspective view of a corn harvester, embodying the present invention. Fig. 2 is a plan view with some parts in horizontal section, of the structure of Fig. 1, one position of the draft end of the vehicle being shown in full lines, and another position in dotted lines. Fig. 3 is an elevation of the structure of Fig. 2, with the near rear wheel omitted and the rear axle shown in cross section. Fig. 4 is a section on the line 4—4 of Fig. 2, distant parts being omitted. Fig. 5 is a section on the line 5—5 of Fig. 2. Fig. 6 is a detail section showing a latch structure for the dumping member of the vehicle.

Referring to the drawings, there is shown a vehicle comprising a dumping cart 1, mounted to turn upon an axle 2 constituting the rear axle of the vehicle, the cart and axle being related to cause the cart to over balance toward the dumping position. The axle 2 is mounted upon a frame comprising side beams 3 extending forwardly beyond the front end of the dumping member 1 for an appropriate distance and connected together by cross beams 4 disposed above the beams 3, and other cross beams 5 disposed below the beams 3 which latter may be considered as longitudinal beams. The cross beams 5 carry at the mid point of their length another longitudinally disposed beam 6 of less forward extent than the beams 3 and located below the beams 5 about mid way between the beams 3. Connected at the front ends to the forward ends of the beams 3 are bars 7 rising from their points of connection with the beams 3 toward the dumping cart 1 and terminating short thereof in front of the cart, the rear high ends of the bars 7 being upheld by short posts 8, it being understood that the parts are all securely fastened together, and suitable brace rods such as shown at 9 and 10 are employed wherever additional strength is desired.

The beams 3, 4 and 5 are so disposed that there is provided a space between the beams 4 and 5 and also between the beams 3 and located in underriding relation to the cart. The space is occupied by the rear end of a reach 11, which, in the particular showing of the drawings, is formed of two beams 12 in parallel relation, joined together at intervals so that the reach will move in the space between the beams 4 and 5 in a direction lateral of its length, and lateral of the length of the side beams 3, the extent of lateral travel of the reach being such as is permitted by the spacing of the side beams 3.

The front and rear beams 5 carry respective rack bars 13 shown in the drawings as pin rack bars, without, however, limiting the invention to the use of such particular form of rack bars. Certain of the pins may be elongated to form sustaining bolts 14 for the rack bars or these rack bars may be secured to the respective beams 5 in any other suitable manner.

Erected on the reach bars 12 in front of the cart 1 is a leg 15 and a post 16, the latter being in spaced relation to the leg 15 to the rear thereof. The leg and post carry a platform 17 which may be utilized as a seat for an operator. The post 16 has journaled in it a crank shaft 18 near its upper end and this crank shaft has fast on it a sprocket wheel 19. Journaled in the lower end of the post 16 and in a suitable bearing 20 at the rear end of the reach 11 is a shaft 21 carrying a sprocket wheel 22 in front of the post 16, alining with the sprocket wheel 19 and connected thereto by a sprocket chain 23. Fast on the shaft 21 are gear wheels 24 meshing with the respective rack bars 13. The crank shaft 18 is provided with a crank handle 25 whereby the shaft 21 may be rotated at the will of an operator and the reach is caused to travel from one side of the vehicle to the other, as desired.

Pivotally mounted on the forward end of the beam 6 is a cross bar 26, the pivot supporting the cross bar mid way of the length of the latter, and fast on the cross bar is a cutter blade 27 of sufficient length to extend across the vehicle between the side bars 3 so as to engage corn stalks entering between these bars. The front bar 5 has fast to its under side near each end, a bevel block 28 in position to be engaged by the corresponding end of the bar 26 when the bar is swung about its pivot connection with the bar 6 indicated at 29 into inclined relation to the line of draft. Adjacent to the blocks 28 the forward cross beams 4 and 5 have matching perforations 30 for the reception of a pin 31 which, when in place, projects in front of the adjacent end of the bar 26, such end being the rear end of said bar, so that the bar is held in an inclined position between the corresponding block 28 and the pin 31. In the drawings, the pin 31 is shown with a turned-over end 32 providing a handle for manipulating the pin and for preventing the pin from dropping through the perforations. At the forward ends of the inclined bars 7 are fenders 33 in position to direct the corn against the knife or cutter blade and to aid in lifting fallen corn, the lower forward end of the corresponding bar 7 contributing to the lifting of the corn. Each bar 7 near its lower end is also provided with an upstanding guide 34 further contributing to the lifting of fallen corn.

The dumping cart body 1, has a tendency to dump, but is held in the receiving position by a latch member 35 pivoted to the forward beam 4 and provided with a foot piece 36 by means of which the cart may be released from the latch. A constant tendency toward the latched position is provided by a spring 37 between the beam 4 and the foot piece of the latch. To avoid interference with the latch by corn stalks, a guard hood 38 is placed in overriding relation to the latch. The forward end of the reach 11 has a rising half arch 39 secured to it, projecting forwardly therefrom and carrying an upright journal bearing 40 for an upright pin 41 rising from an axle 42 constituting the front axle of the vehicle and carrying closely associated wheels 43 capable of turning on the axis of the pin 41 under the arch 39. Shafts 44 are attached to the axle 42 or any other means for attaching a draft animal to the vehicle may be provided.

With the present invention, one operative position of the parts is that shown in Figs. 1 and 2, where the reach is at one side of the rear frame made up of the beams 3, 4, and 5, so that there is clear passage for the corn to the blade or knife 27, whereby the corn stalks are severed and dropped upon the cart 1, and when the latter is filled, it is released from the restraint of the latch 35, and then automatically dumps to discharge its load. With such an arrangement, the draft animal or animals travel on cleared ground out of the way of standing or fallen corn, and hence are not hampered at all by such corn. In the showing of Figs. 1 and 2, the line of draft represented by the reach 11, is at the right of the corn engaging portion of the vehicle as viewed from the driver's side of the vehicle. When it is desired to travel on the left hand side of the corn being treated, the handle 25 is rotated, thereby rotating the sprocket wheel 19, which through the sprocket chain 23 and the sprocket wheel 22 imparts rotative movement to the shaft 21 wherefore the reach is propelled across the corn receiving end of the vehicle to the other side thereof. The cutter blade 27 may assume either inclined position irrespective of the adjustment of the reach and therefore may operate with either end forward.

Whatever be the adjustment of the reach whether to the right or to the left of the center line of the corn receiving end of the vehicle, the draft animals are located to one side of the standing corn with the corn in front of the knife or blade in the direction of travel of the latter toward the standing corn stalks.

What is claimed is:—

1. A corn harvester comprising a vehicle having front and rear portions with a reach connecting them, and with said reach adjustable laterally of the rear portion to opposite sides of the center line thereof, and a cutter for corn stalks mounted on the vehicle independently of the reach, with the lateral adjustment of the latter sufficient to present operative portions of the cutter on one side or the other of the reach.

2. A corn harvester comprising a vehicle with front and rear supporting members and with a reach connecting them, said reach having a range of movement to opposite sides of the center line of the vehicle and said vehicle being provided with a cutter blade mounted thereon independently of the reach and the movements of the latter to opposite sides of the center line of the vehicle, and exposed on that side of the reach opposite to the side of the vehicle toward which the reach is adjusted.

3. A corn harvester provided with front and rear portions having supports for traveling upon the ground, said front portion having means for the application of propelling forces, a reach extending between and connecting the front and rear portions of the vehicle, said reach being bodily adjustable laterally of the rear portion of the vehicle to opposite sides of the center line thereof, and cutting means carried by the rear portion of the vehicle independently of the reach and located on the rear portion of the vehicle to be on that side of the reach toward the center line of the vehicle when the reach is adjusted to one side or the other of the rear portion of the vehicle.

4. A corn harvester provided with front and rear portions having supports for traveling upon the ground, said front portion having means for the application of propelling forces, a reach extending between and connecting the front and rear portions of the vehicle, said reach being bodily adjustable laterally of the rear portion of the vehicle to opposite sides of the center line thereof, and cutting means carried by the rear portion of the vehicle independently of the reach and located to be on that side of the reach toward the center line of the vehicle when the reach is adjusted to one side or the other of the rear portion of the vehicle, said cutting means being movable about an upright axis in substantially the center line of the rear portion of the vehicle for inclination to the line of draft and toward either side of the vehicle.

5. A corn harvester comprising a vehicle having front and rear portions with a reach connecting them, said reach being movable bodily in a direction laterally of the rear portion of the vehicle and in parallel relation to the longitudinal center line of travel of the vehicle, the forward portion of the vehicle being connected to the reach for lateral movement therewith, and the rear portion of the vehicle having cutting means thereon independently of the reach and its lateral movements on the vehicle and extending to opposite sides of the center line of the vehicle and to one side or other of the reach in accordance with the side to which the reach is adjusted.

6. A corn harvester comprising a vehicle having front and rear portions with a reach connecting them, said reach being movable bodily in a direction laterally of the rear portion of the vehicle and in parallel relation to the longitudinal center line of travel of the vehicle, the forward portion of the vehicle being connected to the reach for lateral movement therewith, and the rear portion of the vehicle having cutting means thereon independently of the reach and its lateral movements on the vehicle and extending to opposite sides of the center line of the vehicle and to one side or other of the reach in accordance with the side to which the reach is adjusted, said cutting means comprising a pivoted blade movable about its pivot into slanting relation to the line of travel of the vehicle.

7. A corn harvester comprising a vehicle having front and rear portions with a reach connecting them, said reach being movable bodily in a direction laterally of the rear portion of the vehicle and in parallel relation to the longitudinal center line of travel of the vehicle, the forward portion of the vehicle being connected to the reach for lateral movement therewith, and the rear portion of the vehicle having cutting means thereon independently of the reach and its lateral movements on the vehicle and extending to opposite sides of the center line of the vehicle and to one side or other of the reach in accordance with the side to which the reach is adjusted, said cutting means comprising a pivoted blade movable about its pivot into slanting relation to the line of travel of the vehicle, and said reach and vehicle having coacting means thereon for the lateral adjustments of the reach.

8. A corn harvester comprising a vehicle with the front and rear portions and a reach connecting them, said reach and rear portion of the vehicle having coacting means for bodily movement of the reach cross-wise of the vehicle in parallel relation to the longitudinal center line of the vehicle, and cutting means independently of the reach and its bodily movements on the vehicle and extending cross-wise of the vehicle in slanting relation to the longitudinal center line.

9. A corn harvester comprising a vehicle with front and rear portions and a reach connecting them, said reach and rear portion of the vehicle having coacting means for bodily movement of the reach cross-wise of the vehicle in parallel relation to the longitudinal center line of the vehicle, and cutting means independently of the reach and its bodily movements on the vehicle and extending cross-wise of the vehicle in slanting relation to the longitudinal center line, said cutting means comprising a blade with a pivotal mounting therefor mid way of it length whereby the blade may be slanted toward either side of the vehicle.

10. A corn harvester comprising a vehicle having front and rear portions with the rear portion of the vehicle provided with forwardly directed gathering means, and a reach connecting the forward and rear portions of the vehicle, said reach being bodily adjustable with the forward portion of the vehicle cross-wise of the rear portion of the vehicle from one side to the other of said vehicle, and cutting means independently of the reach and its bodily movements on the vehicle and extending across the vehicle in position to engage corn entering between the reach and the gathering means on the remote side of the vehicle.

11. A corn harvester comprising a vehicle with front and rear portions and a reach connecting the front portion to the rear portion, and bodily adjustable cross-wise of the vehicle in substantially parallel relation to the longitudinal center line of the vehicle, and means for effecting a lateral adjustment of the reach comprising rack bars spaced apart lengthwise of the vehicle and extended cross-wise thereof, and a longitudinally extended shaft on the reach having gear wheels thereon meshing with the rack bars and actuating means for the shaft carried by the reach.

12. A corn harvester comprising a vehicle with front and rear portions and a reach connecting the front portion to the rear portion, and bodily adjustable cross-wise of the vehicle in substantially parallel relation to the longitudinal center line of the vehicle, and means for effecting a lateral adjustment of the reach, comprising rack bars spaced apart lengthwise of the vehicle and extending cross-wise thereof, a longitudinally extended shaft on the reach having gear wheels thereon meshing with the rack bars, and actuating means for the shaft carried by the reach, said actuating means comprising a crank shaft in elevated relation to the first named shaft, and driving connections therebetween.

13. In a corn harvester, a vehicle having front and rear portions, with a connecting reach adjustable with the front portion laterally of the vehicle to opposite sides of the center line thereof, and a cutting blade carried by the rear portion of the vehicle independently of the reach mounted to swing about a pivot intermediate of the sides of the vehicle and intermediate of the ends of the blade, the rear portion of the vehicle being provided with abutting and locking means for the blade to hold it in either of different slanting positions with relation to the line of draft.

14. In a corn harvester, a vehicle having front and rear portions, with a connecting reach adjustable with the front portion laterally of the vehicle to opposite sides of the center line thereof, and a cutting blade mounted on the rear portion of the vehicle to swing about a pivot intermediate of the sides of the vehicle and intermediate of the ends of the blade, the rear portion of the vehicle being provided with abutting and locking means for the blade to hold it in either of different slanting positions with relation to the line of draft, and the rear portion of the vehicle also having gathering means with guards thereon in position to override either end of the blade when forward to direct the corn to be cut away from interfering relation with such forward end of the blade.

In testimony, that I claim the foregoing as my own, I have hereto affixed my signature in the presence of two witnesses.

BENJAMIN ERNEST REED.

Witnesses:
 HERMAN HARVEY,
 GEO. ELLWOOD THRASHER.

Copies of this patent may be obtained for five cents each, by addressing the "Commissioner of Patents, Washington, D. C."